United States Patent
Shah et al.

(10) Patent No.: US 12,014,141 B2
(45) Date of Patent: Jun. 18, 2024

(54) SYSTEMS AND METHODS FOR IMPROVED TRANSACTION CATEGORIZATION USING NATURAL LANGUAGE PROCESSING

(71) Applicant: Intuit Inc., Mountain View, CA (US)

(72) Inventors: Tanmay Shah, Mountain View, CA (US); Pavanakumar Manakatti, Mountain View, CA (US); Suchit Kumar Biswal, Mountain View, CA (US); Neha Kumari, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 743 days.

(21) Appl. No.: 17/167,052

(22) Filed: Feb. 3, 2021

(65) Prior Publication Data

US 2022/0245342 A1 Aug. 4, 2022

(51) Int. Cl.
 *G06F 40/284* (2020.01)
 *G06F 16/35* (2019.01)
 *G06Q 40/12* (2023.01)

(52) U.S. Cl.
 CPC ............ *G06F 40/284* (2020.01); *G06F 16/35* (2019.01); *G06Q 40/12* (2013.12)

(58) Field of Classification Search
 CPC ...... G06F 40/284; G06F 16/35; G06F 16/355; G06Q 40/12
 USPC .......................................................... 704/9
 See application file for complete search history.

(56) References Cited

U.S. PATENT DOCUMENTS

2018/0150551 A1* 5/2018 Wang .................... G06F 16/338

* cited by examiner

*Primary Examiner* — Thierry L Pham
(74) *Attorney, Agent, or Firm* — DLA PIPER LLP (US)

(57) ABSTRACT

Systems and methods are provided for categorizing a transaction description using natural language processing.

18 Claims, 12 Drawing Sheets

| Cleansed Description | User recategorizing to (2101=Transfer Category) |
|---|---|
| Transfer to LINE OF CREDIT UNSECURED 4065705 HH001 | 2101 |
| Transfer to LINE OF CREDIT UNSECURED 4065705 IH023 | 2101 |
| Transfer to LINE OF CREDIT UNSECURED 4065705 IH100 | 2101 |
| Transfer to LINE OF CREDIT UNSECURED 4065705 JG593 | 2101 |
| Transfer to LINE OF CREDIT UNSECURED 4065705 JI022 | 2101 |
| Transfer to LINE OF CREDIT UNSECURED 4065705 JO201 | 2101 |

*FIG. 2A*

| Cleansed Description | Super Cleansed Description |
|---|---|
| Transfer to LINE OF CREDIT UNSECURED 4065705 HH001 | Transfer to LINE OF CREDIT |
| Transfer to LINE OF CREDIT UNSECURED 4065705 IH023 | Transfer to LINE OF CREDIT |
| Transfer to LINE OF CREDIT UNSECURED 4065705 IH100 | Transfer to LINE OF CREDIT |
| Transfer to LINE OF CREDIT UNSECURED 4065705 JG593 | Transfer to LINE OF CREDIT |
| Transfer to LINE OF CREDIT UNSECURED 4065705 JI022 | Transfer to LINE OF CREDIT |
| Transfer to LINE OF CREDIT UNSECURED 4065705 JO201 | Transfer to LINE OF CREDIT |

*FIG. 2B*

SYSTEMS AND METHODS FOR IMPROVED TRANSACTION CATEGORIZATION USING NATURAL LANGUAGE PROCESSING

BACKGROUND OF THE DISCLOSURE

Financial transactions are an indispensable part of people's day-to-day lives; individuals and families being able to manage their income and spending can help ensure financial stability. Understanding spending patterns can help people make better monetary decisions. However, reaching that understanding from raw transaction data can be difficult and not particularly illuminating.

BRIEF DESCRIPTION OF THE FIGURES

FIG. 2A shows examples of transaction categorization results using previous systems.

FIG. 2B shows examples of improved transaction categorization results according to some embodiments of the present disclosure.

DETAILED DESCRIPTION OF SEVERAL EMBODIMENTS

The categorization of user financial transactions is a feature of many existing financial management software platforms. However, existing transaction categorization techniques lack accuracy and the ability to continuously learn and generate new categories. Accordingly, embodiments of the present disclosure relate to various systems and methods for improving transaction categorization. The disclosed principles improve categorization using, among other things, natural language processing. The systems and methods described herein utilize "bag-of-words" techniques and can analyze each word within a transaction's description to determine what is important and what can be disregarded. A model is trained based on an existing database of transactions and is used to calculate a frequency value and transition probability for each word that appears in the database. The frequency value reflects how often the word appears and the transition probability reflects how often that word appears directly after another specific word. In some embodiments, frequency values for bigrams can be maintained in the database, as well. These calculated values can be used to generate categories and subsequently categorize future transactions in accordance with the disclosed principles.

Figure 1:
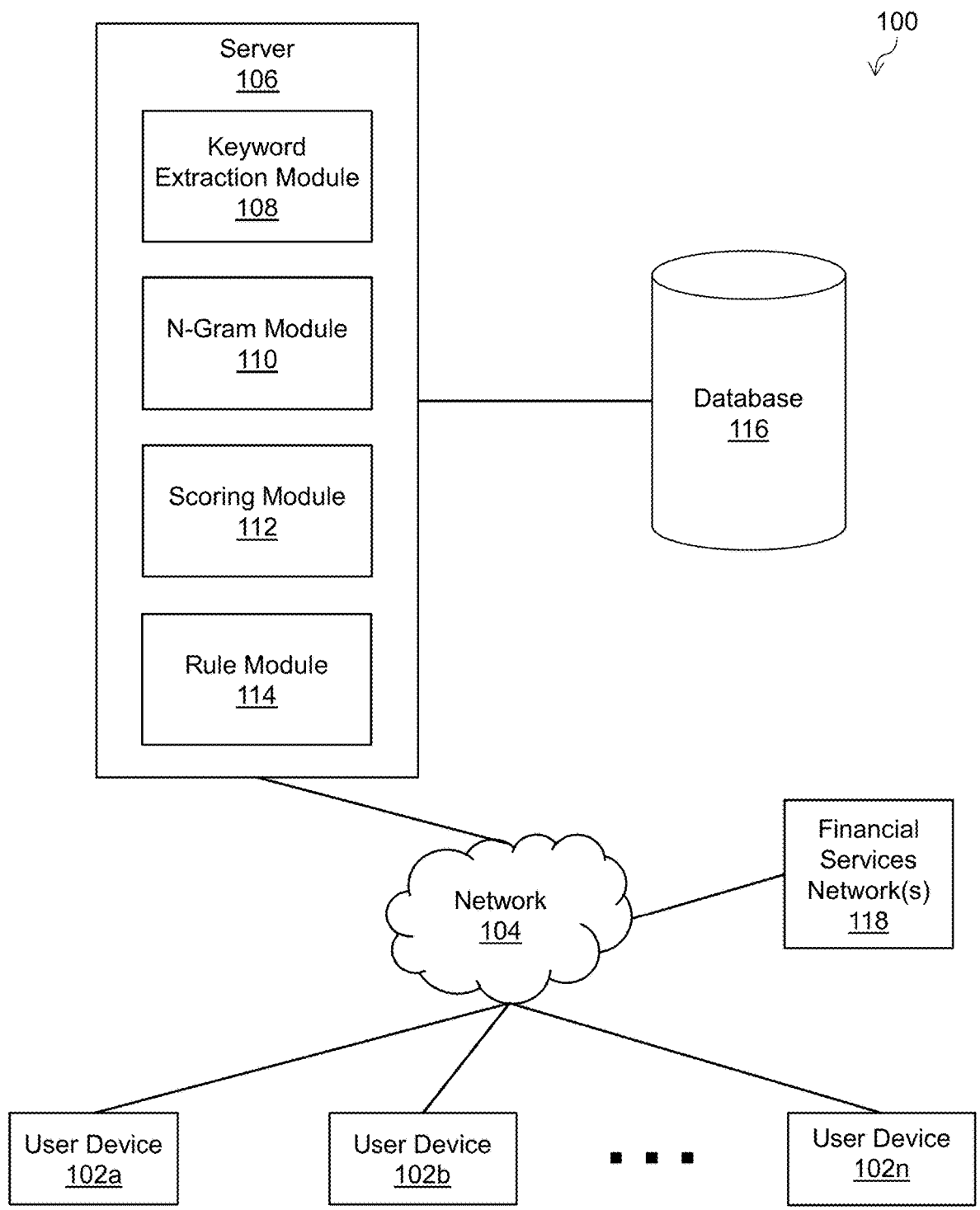
FIG. 1 is a block diagram of an example system for improving transaction categorization using natural language processing according to some embodiments of the present disclosure.

FIG. 1 is a block diagram of an example system 100 for improving transaction categorization using natural language processing according to some embodiments of the present disclosure. The system 100 can include a plurality of user devices 102a-n (generally referred to herein as a "user device 102" or collectively referred to herein as "user devices 102") and a server 106, which are communicably coupled via a network 104. Components of the system 100 can also communicate with one or more financial services networks 118 via the network 104. In one or more embodiments, the server 106 is configured to receive financial transactions from a financial services network 118. For example, in response to a user authorizing a transaction (e.g., with a credit or debit card, via an ACH transfer, etc.), the financial services network 118 can send the transaction and associated information in real time to the server 106. The server 106 can store the received transactions and associated information in a database 116.

A user device 102 can include one or more computing devices capable of receiving user input, transmitting and/or receiving data via the network 104, and or communicating with the server 106. In some embodiments, a user device 102 can be a conventional computer system, such as a desktop or laptop computer. Alternatively, a user device 102 can be a device having computer functionality, such as a personal digital assistant (PDA), a mobile telephone, a smartphone, or other suitable device. In some embodiments, a user device 102 can be the same as or similar to the user device 900 described below with respect to FIG. 9. In some embodiments, the system 100 can include any number of user devices 102.

The network 104 can include one or more wide areas networks (WANs), metropolitan area networks (MANs), local area networks (LANs), personal area networks (PANs), or any combination of these networks. The network 104 can include a combination of one or more types of networks, such as Internet, intranet, Ethernet, twisted-pair, coaxial cable, fiber optic, cellular, satellite, IEEE 801.11, terrestrial, and/or other types of wired or wireless networks. The network 104 can also use standard communication technologies and/or protocols.

As shown in FIG. 1, the server 106 includes a keyword extraction module 108, an n-gram module 110, a scoring module 112, and a rule module 114. The server 106 is communicably connected to the database 116. In some embodiments, the database 116 can include one or more databases, such as one database that stores frequency values and transition probabilities of words or tokens and another database that stores rules for categorizing transactions in accordance with the disclosed principles. The server 106, as described above, is configured to receive transactions from one or more financial services networks 118. In some embodiments, receiving a financial transaction can include receiving various associated information such as e.g., an amount, payment method, date, time, and description. The server 106 can maintain a large dataset of historical transactions from a userbase (e.g., the users associated with the user devices 102) within the database 116. Once a transaction is received, the modules 108-114 are used to employ various natural language processing techniques to categorize the transaction in accordance with the disclosed principles.

In one or more embodiments, the keyword extraction module 108 extracts important keywords from a transaction description by determining which words in the description are important and which are unimportant (as described below with respect to FIGS. 4A-4C). The keyword extraction module 108 may also be configured to tokenize descriptions (e.g., divide a description into various "tokens" or words/groupings of alphanumeric characters) and perform statistical analysis on each token to determine its importance level. The n-gram module 110 is configured to, given a set of words (e.g., keywords extracted from a description by keyword extraction module 108), generate n-grams of the words in the set. For example, given a set of five words, the n-gram module 110 can generate bigrams, 3-grams, 4-grams, and 5-grams. In some embodiments, a scoring module 112 receives n-grams from the n-gram module 110 and calculate scores for each n-gram. When calculating a score for an n-gram, the scoring module 112 references a database (e.g., database 116) to obtain various parameters for the tokens within the n-gram. For example, the scoring module 112 can obtain frequency values and transition probabilities associated with each token by querying the database 116 for each token. The n-gram score can be calculated based on the obtained frequency values and transition probabilities. In some embodiments, the rule module 114 identifies the n-gram with the highest score and stores the n-gram in the database 116 as a rule. When future transactions are received in real time, the description of the transaction can be compared to the rules stored in the database 116 for categorization in accordance with the disclosed principles.

FIG. 2A shows examples of transaction categorization results using previous systems. The first column (labeled as "cleansed description") represents example transaction descriptions that have been "cleansed" by the previous system. The second column represents the category that users recategorized the transactions to. In the illustrated example, there are six transactions. The transactions shown have similar descriptions (i.e., they each contain the text "Transfer to LINE OF CREDIT UNSECURED") that indicate that the transactions were transfers to a line of unsecured credit. However, each transaction has a different identification number (e.g., HH001, IH023, IH100, JG593, JI022, and JO201). Thus, with existing systems, the "cleansed description" still includes unnecessary and confusing information, which can negatively impact categorization. Existing systems have difficulty recognizing that the illustrated transactions should have the same description, even after users have recategorized them to a "transfer category" (e.g., 2101).

FIG. 2B shows examples of improved transaction categorization results according to some embodiments of the present disclosure. The first column (labeled as "cleansed description") represents example transaction descriptions that have been "cleansed" by the disclosed principles. The second column represents a category determined by the disclosed principles, not the user. In the illustrated example, the same six transactions are categorized by a "super cleansed description." Using the systems and methods described herein, only the most important keywords are maintained; unimportant words are identified and removed, and the transactions can be automatically categorized to the same category ("transfer category" 2101) without the need for user intervention or recategorization. This improves accuracy of the categorization and allows, among other things, the disclosed systems and methods to learn new categorization rules.

Figure 3:
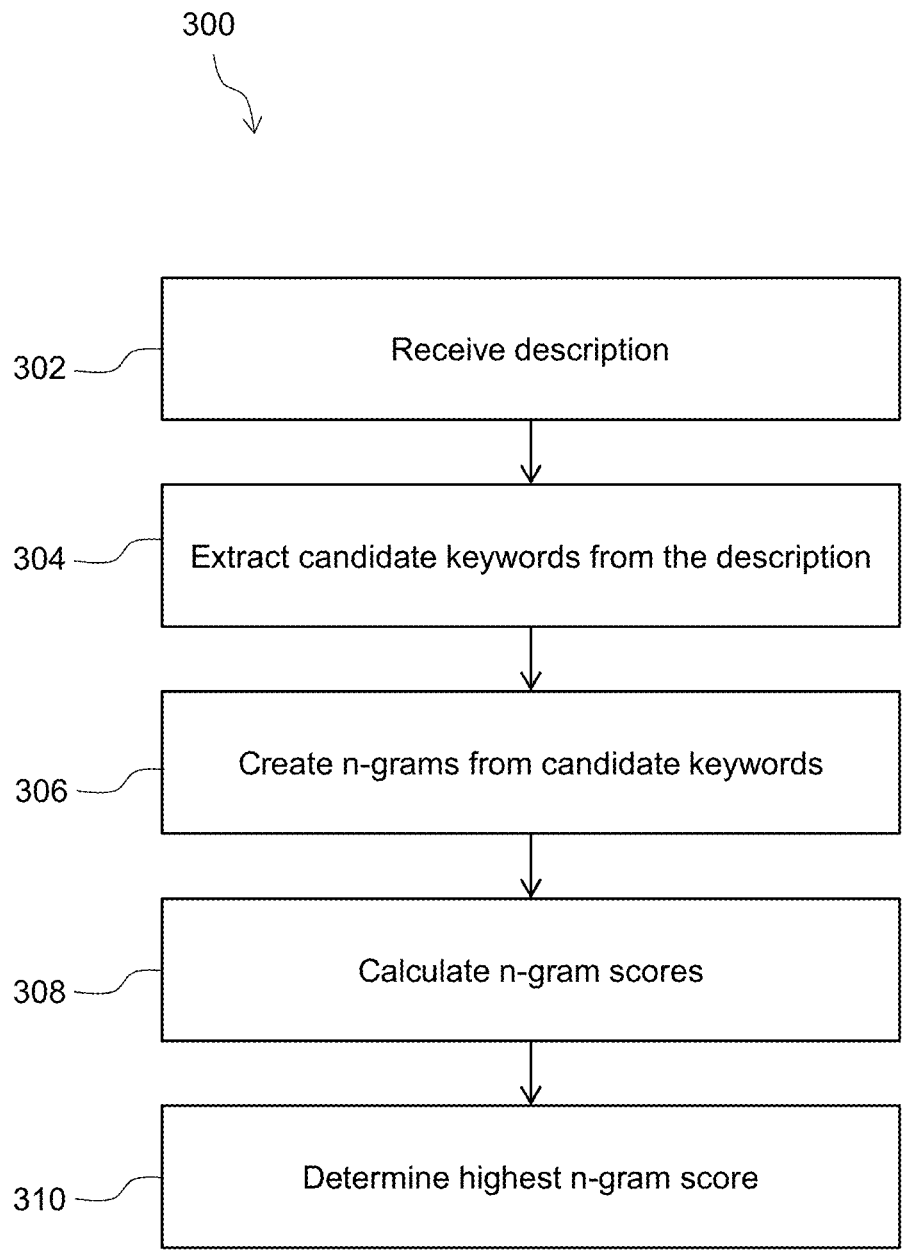
FIG. 3 is a flow diagram showing example processing that can occur to categorize a transaction using natural language processing according to some embodiments of the present disclosure.

FIG. 3 is a flow diagram showing an example process 300 that is used to categorize a transaction using natural language processing according to some embodiments of the present disclosure. In some embodiments, the process 300 can be performed by the server 106 and its various modules. The process 300 is used to "clean" a description; the result of the process 300 can be a super-cleansed description as shown in FIG. 2B, which can be used to create rules in a database for categorizing future transactions. For example, for a particular transaction description (e.g., "Transfer to LINE OF CREDIT UNSECURED 4065705 HH001"), the description (e.g., a textual phrase associated with and describing the transaction) can be split into a "bag" of words without punctuation (e.g., transfer, to, line, of, credit, unsecured, 4065705, hh001) and all possible n-grams can be created for this bag. As described herein, an n-gram is a permutation of a combination of words from the bag. For example, a bi-gram includes all possible combinations of two words from the bag of words, a 3-gram includes all possible combinations of three words from the bag of words, etc. Each possible n-gram can be scored based on the previously calculated frequency values and transition probabilities of each word in the n-gram. The n-gram with the highest score can be selected as the new "cleansed" or "super-cleansed" description of the transaction. A description cleansed according to the systems and methods described herein can then be used to generate rules and lead to improved categorization accuracy.

At block 302, the server 106 receives a description associated with a transaction. Within the context of the process 300, the description can be received from various places. For example, in the case of generating cleansed descriptions to create rules, the transaction can be a historical transaction that is retrieved from the database 116. In another example, when the cleansed descriptions are being generated to categorize a transaction with pre-existing rules, the transaction is received from the financial services network 118.

At block 304, the keyword extraction module 108 extracts candidate keywords from the description received at block 302. Candidate keywords can also be referred to as "important" words. In some embodiments, extracting candidate keywords from the description can include analyzing the various words within a description to determine which words are important and which words are not, and then extracting the important words while filtering out or removing the unimportant words. Additional details related to identifying and extracting candidate keywords from the description are described below in relation to FIGS. 4A-4C.

At block 306, the n-gram module 110 creates n-grams from the candidate keywords extracted at block 304. The n-gram module 110 can create all possible permutations of n-grams for the set of candidate keywords based on how many keywords there are. For example, if there are four candidate keywords, the n-gram module 110 can create all possible bigrams, 3-grams, and 4-grams. For example, various n-grams for the description "Transfer to LINE OF CREDIT UNSECURED 4065705 HH001" and candidate keywords [transfer, to, line, of, credit, unsecured, hh] are shown below in Table 1.

TABLE 1

| | |
|---|---|
| Bigrams | transfer to, to line, line of, . . . unsecured, hh |
| Trigrams | transfer to line, to line of, . . . credit unsecured hh |
| 4-gram | transfer to line of, to line of credit, . . . of credit unsecured hh |
| 5-gram | transfer to line of credit, to line of credit unsecured, line of credit unsecured hh |
| 6-gram | transfer to line of credit unsecured, to line of credit unsecured hh |
| 7-gram | transfer to line of credit unsecured hh |

At block 308, the scoring module 112 calculates a score for each n-gram created at block 306. For example, the scoring module 112 can calculate a score for each of the bigrams, trigrams, 4-grams, etc., that are created for a specific set of extracted candidate keywords. The scores can be calculated based on a frequency value of each word in the n-gram and an associated transition probability value. In some embodiments, frequency values and transition probability values can be stored within the database 116 and accessed by the scoring module 112 for use during score calculation. In some embodiments, the frequency values and transition probability values are determined by analyzing a userbase of transactions and transaction descriptions stored in database 116. For example, based on all words that appear in all transaction descriptions in the database 116, the frequency of a word's (e.g., "transfer") appearance will indicate its frequency value. The values are determined prior to categorization of any transactions but can be updated continuously during categorization. In some embodiments, the frequency value for an n-gram can include a sum of the frequency scores of all words or tokens within the n-gram. Similarly, the transition probability value for an n-gram can include a sum of the transition probability values of all words or tokens within the n-gram. In some embodiments, the total score for an n-gram can be calculated based on Equation 1 below:

$$\text{Score} = \text{freq}_{qweight} * \text{freq}_{score} + \text{transition}_{prob_{weight}} * \text{transition}_{prob_{score}} \quad (1)$$

where $\text{freq}_{score}$ represents the sum of the frequency values in the n-gram, $\text{transition}_{probscore}$ represents the sum of the transition probability values in the n-gram, and the frequency and transition probability weights $\text{freq}_{weight}$, $\text{transition}_{probweight}$ are pre-determined weight values. In some embodiments, the frequency weight $\text{freq}_{weight}$ can be about 0.95 and the transition probability weight $\text{transition}_{probweight}$ can be about 0.05.

In some embodiments, the scoring module 112 implements one or more penalties during the scoring process. Penalties may include a frequency penalty or a transition probability penalty. For example, if the frequency score of a particular n-gram is lower than a pre-defined threshold (herein referred to as a "frequency penalty threshold"), then a negative value is applied to the total score for the n-gram. Similarly, if the transition probability score of a particular n-gram is lower than a pre-defined threshold (herein referred to as a "transition probability penalty threshold"), then a negative value is applied to the total score for the n-gram. In some embodiments, one or both penalties can be applied to an n-gram. At block 310, the rule module 114 determines the n-gram with the highest score and select this as the "cleaned" description of the original transaction. In some embodiments, the process 300 can be performed on a historical database of user transactions to generate a rules database, where each "cleansed" description can be stored as a rule in the database 116. The rules can be used for future categorization of transactions, which is described below in additional detail with respect to FIG. 6.

Figure 4A:
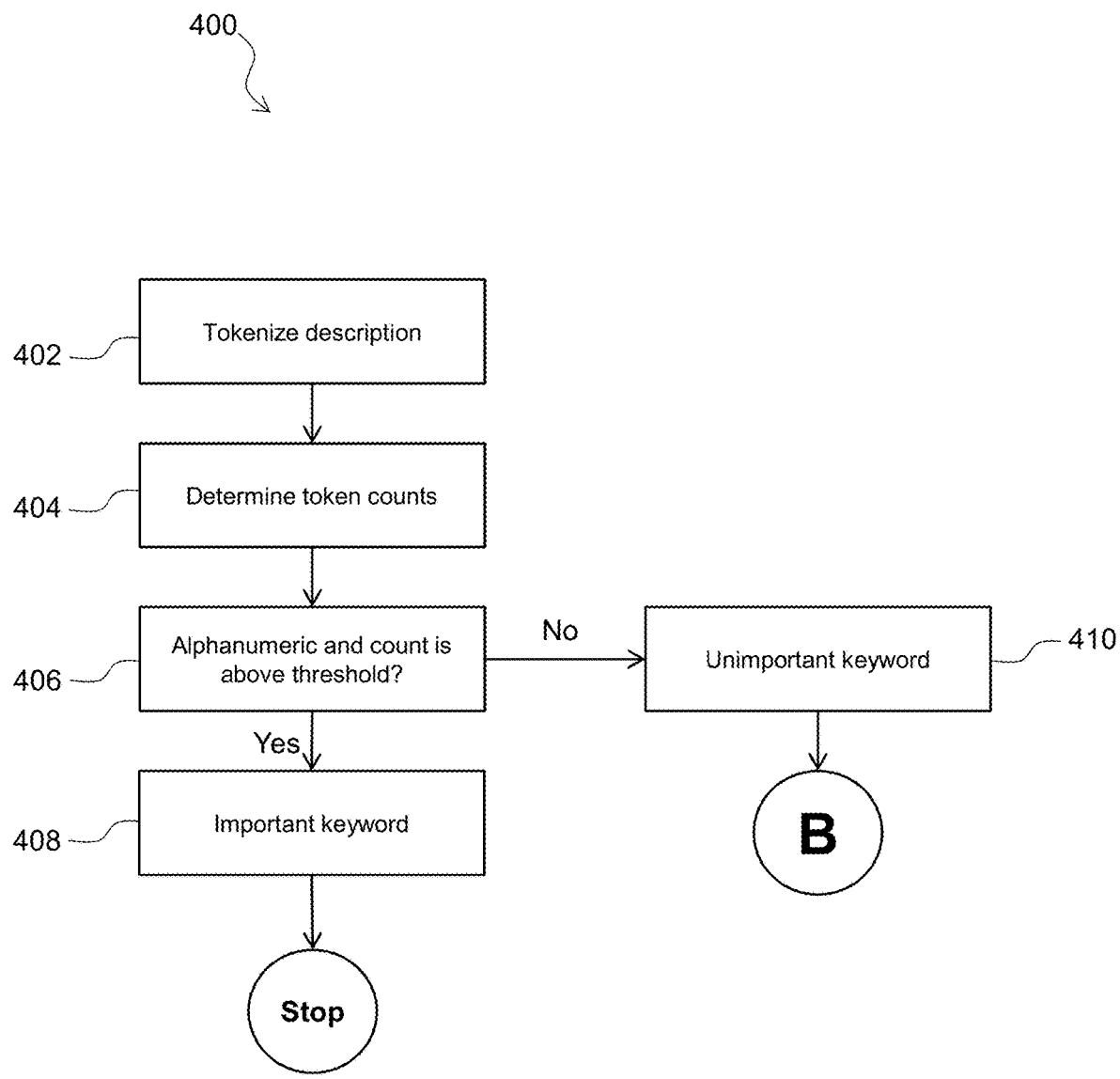
FIGS. 4A-4C are flow diagrams showing processing that can occur to extract candidate keywords from a transaction description according to some embodiments of the present disclosure.
Figure 4B:
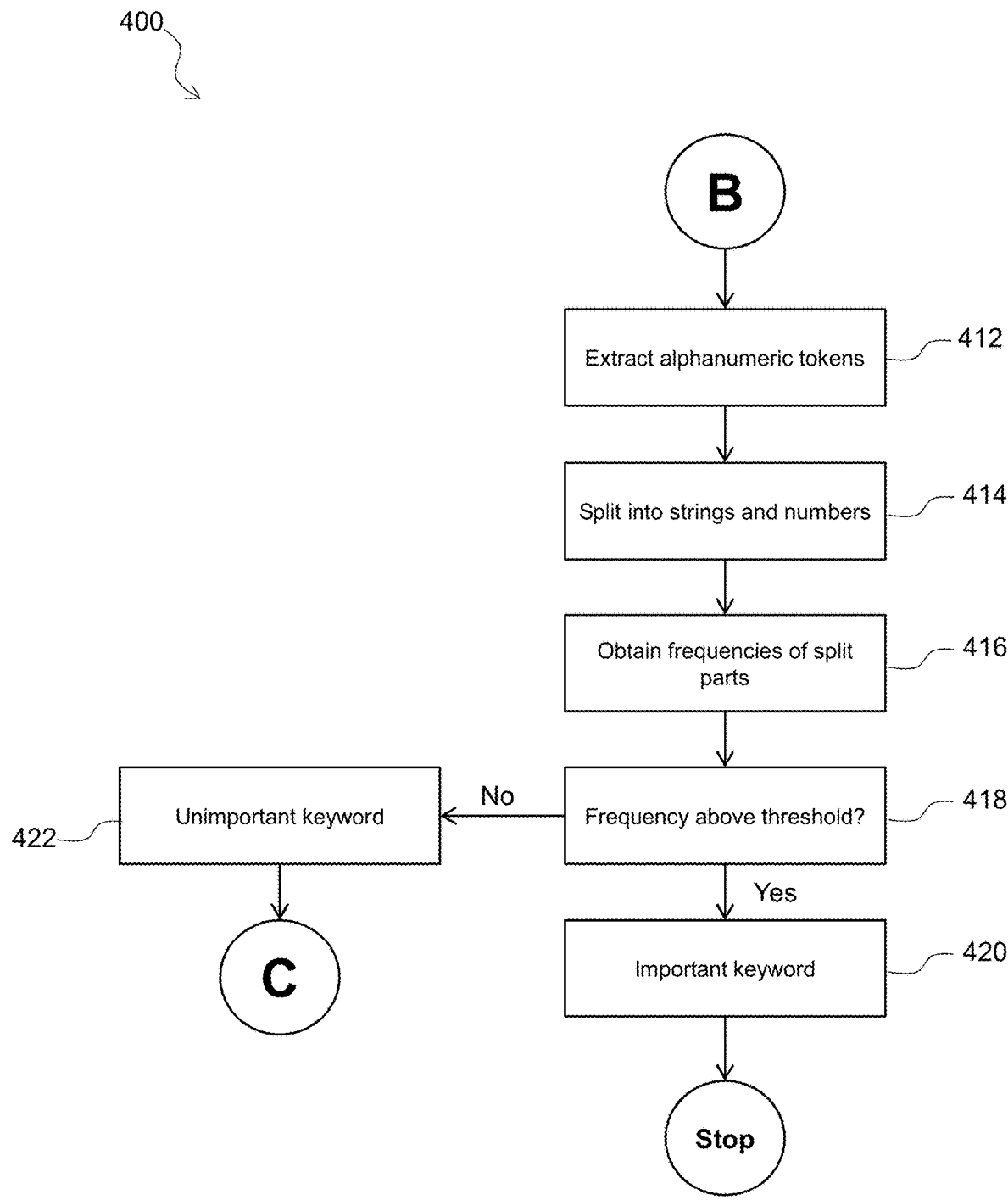
Figure 4C:
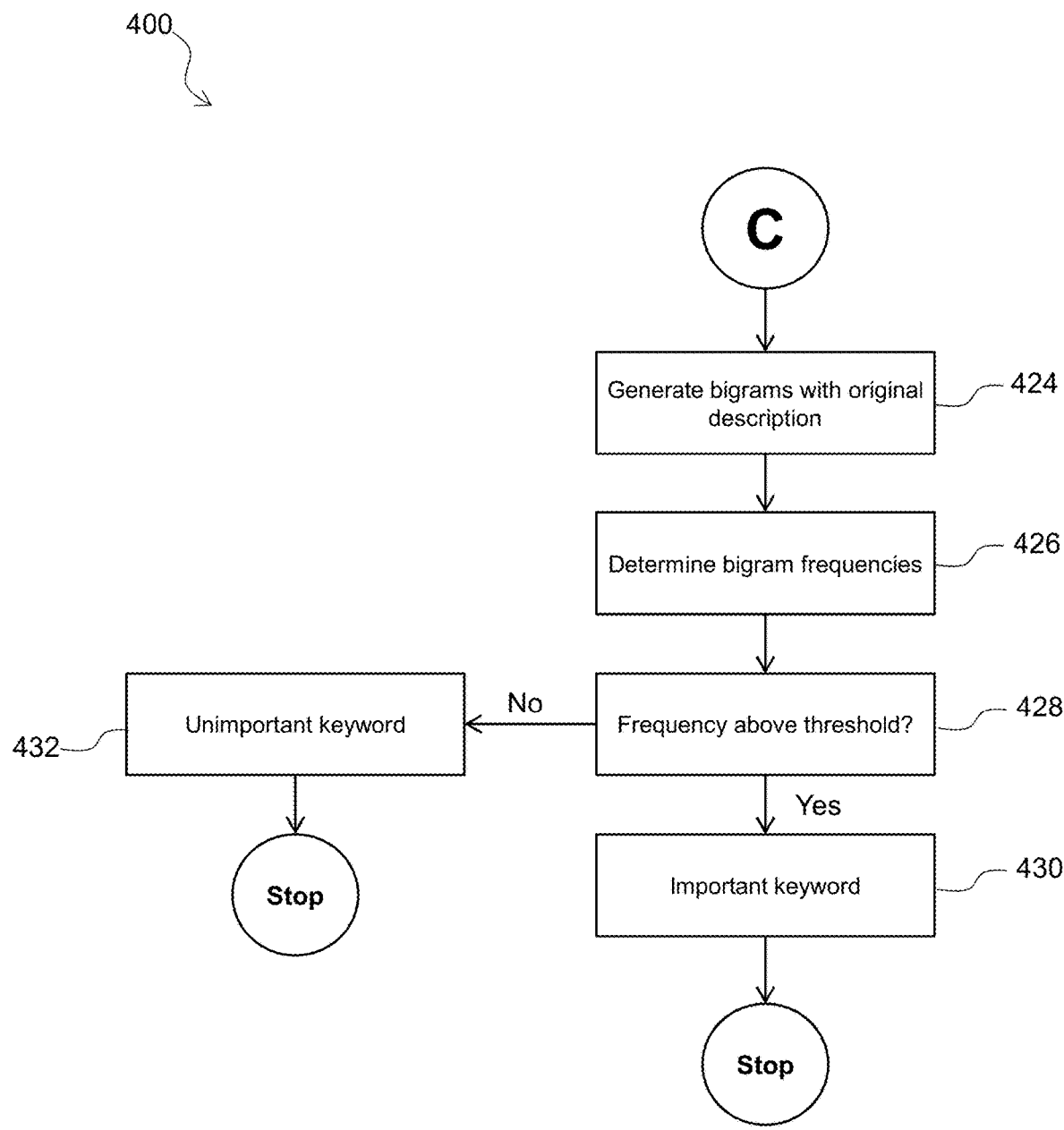

FIGS. 4A-4C are flow diagrams showing a process 400 that can be used to extract candidate keywords from a transaction description according to some embodiments of the present disclosure. Process 400 can be performed by the keyword extraction module 108 at block 304 of process 300. FIG. 4A illustrates the first phase of the process 400. At block 402, the keyword extraction module 108 tokenizes a description associated with a transaction (e.g., a description received by the server 106 at block 302). Tokenizing a description can include separating the description into various tokens or terms/words. A token can be defined as a sequence of characters that are grouped together, such as by spaces or punctuation, although other group delineations are possible. It should be noted that a token may not necessarily include only alphanumeric characters; for examples, a token may include symbols such as an @ or an $. At block 404, the keyword extraction module 108 determines the frequency count for each token (e.g., the number of times the token appears in the description). At block 406, the keyword extraction module 108 determines if each token is important or unimportant. If a token is alphanumeric (e.g., includes only numbers and letters) and the frequency count is above a pre-defined threshold (herein referred to as a "count threshold"), then the token is designated as an important keyword at 408 and the process 400 ends. If the token is not alphanumeric or the frequency count is below the count threshold, then the token is designated as an unimportant keyword at 410 and the process 400 continues at block 412 (FIG. 4B).

FIG. 4B illustrates the second phase of the process 400 and analyzes the tokens designated as unimportant at block 410 (FIG. 4A). At block 412, the keyword extraction module 108 extracts the alphanumeric tokens from the set of unimportant keywords. At block 414, the keyword extraction module 108 splits the extracted alphanumeric tokens into continuous strings (e.g., "split parts"), which can include letters and numbers (e.g., splitting amazon123 into the strings "amazon" and "123"). At block 416, the keyword extraction module 108 obtains frequencies from the split parts of block 414, such as by referencing the database that stores frequency values for words and bigrams for words that appear in the training set of transaction descriptions. At block 418, the keyword extraction module 108 compares the frequency obtained for each split part (e.g., each string created at block 414) to the count threshold. If the obtained frequency is above the count threshold, the string is designated as an important keyword at 420 and the process 400 ends. If the obtained frequency is not above the count threshold, the string is designated as an unimportant keyword at 422 and the process 400 continues at block 424 (FIG. 4C).

FIG. 4C illustrates the third phase of process 400. At block 424, the keyword extraction module 108 generates all possible bigrams with the original description tokenized at block 402. At block 426, the keyword extraction module 108 determines a frequency score for each generated bigram. In some embodiments, the frequency score for a bigram can be the sum of the frequency values for each token in the bigram as obtained from a database, such as database 116. At block 428, the keyword extraction module 108 compares the frequency for each bigram to the count threshold. If the frequency is above the count threshold, then the bigram is designated as an important keyword at 430 and the process 400 ends. If the frequency is not above the count threshold, then the bigram is designated as an unimportant keyword at 432 and the process 400 ends. Upon completion of process 400, all important keywords are designated as "candidate keywords" and are extracted, as described with respect to process 300 in FIG. 3.

Figure 5:
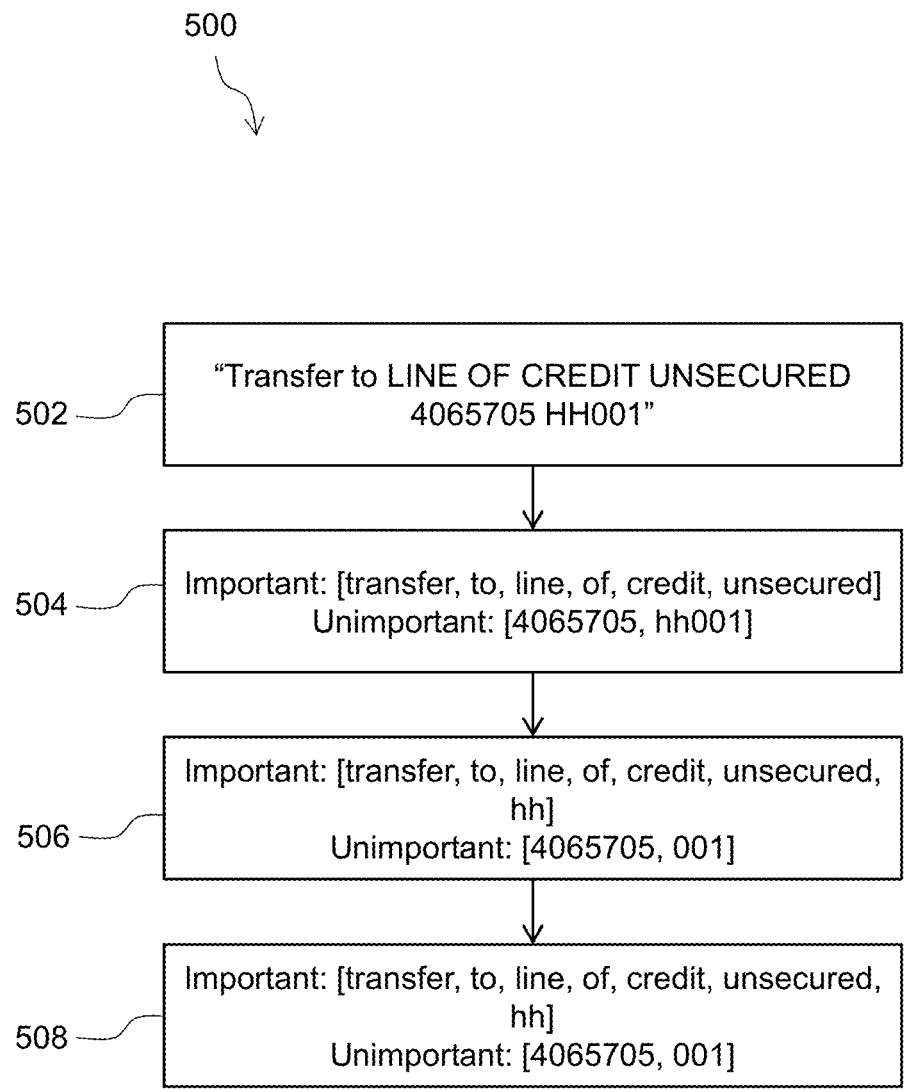
FIG. 5 shows examples of the process of FIGS. 4A-4C being applied to a transaction description according to some embodiments of the present disclosure.

FIG. 5 shows an example categorization flow 500 resulting from processes 300 and 400 being applied to a transaction description according to some embodiments of the present disclosure. At block 502, a description "Transfer to LINE OF CREDIT UNSECURED 4065705 HH001" is received and tokenized. The tokenized description can include the set: [transfer, to, line, of, credit, unsecured, 4065705, HH001]. At block 504, important keywords are determined [transfer, to, line, of, credit, unsecured] and unimportant keywords are determined [4065705, hh001]. At block 506, the important keywords are revised to be [transfer, to, line, of credit, unsecured, hh] and the unimportant keywords are revised to be [4065705, 001]. At block 508, the important keywords are maintained as [transfer, to, line, of credit, unsecured, hh] and the unimportant keywords are maintained as [4065705, 001]. From here, the important keyword set could then be a part of a set of extracted candidate keywords.

Figure 6:
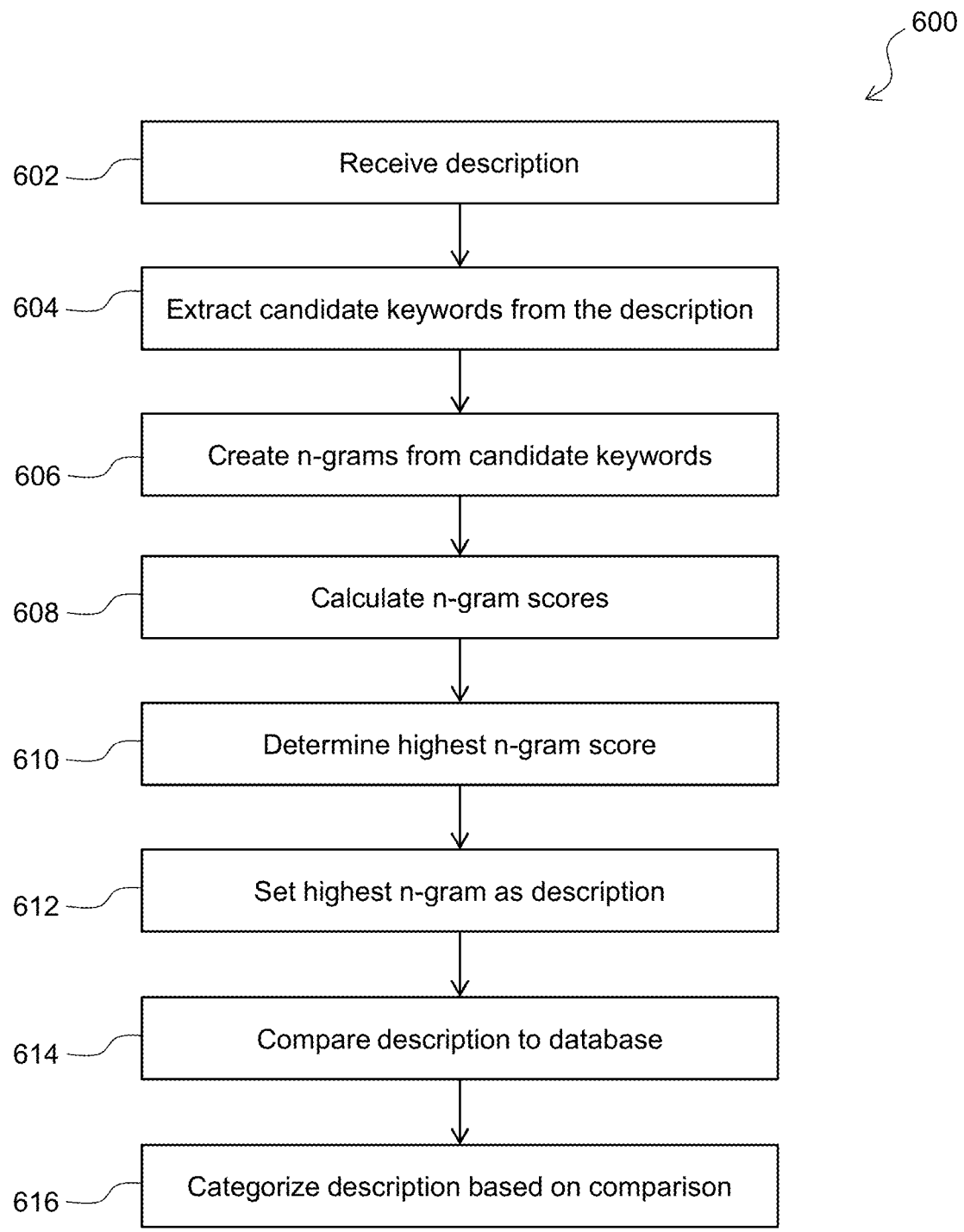
FIG. 6 is flow diagram showing example processing that can occur to categorize a transaction using natural language processing according to some embodiments of the present disclosure.

FIG. 6 is another flow diagram showing a process 600 that can categorize a transaction using natural language processing according to some embodiments of the present disclosure. In some embodiments, the process 600 is a real-time application of process 300 and categorizes a transaction received in real-time based on a database of cleansed descriptions previously created by process 300. At block 602, a description is received by the server 106 (FIG. 1) e.g., from the financial services network 118. In some embodiments, the description is from a transaction that can be a checking account transaction, savings account transaction, credit card transaction, debit card transaction, or any other similar type of financial transaction. At block 604, the keyword extraction module 108 extracts, similar to block 304 of FIG. 3, candidate keywords from the description. In some embodiments, extracting candidate keywords from the description can include the processing illustrated in FIGS. 4A-4C.

At block 606, the n-gram module 110 creates, similar to block 306, n-grams from the received description. In some embodiments, the n-gram module 110 creates all possible permutations of n-grams for the set of candidate keywords based on how many keywords there are. At block 608, the scoring module 112 calculates n-gram scores for the n-grams created at block 606. In some embodiments, similar to block 308, the score can be based on frequency values and transition probability values associated with the words within the n-gram. In some embodiments, the scoring module 112 can use Equation 1 to calculate the score for each n-gram. At block 610, the rule module 114 determines the n-gram with the highest score and, at block 612, designates the n-gram with the highest score as the cleansed description of the originally received description from block 602. At block 614, the rule module 114 compares the cleansed description to entries in a database, such as database 116. The database 116 can include a number of pre-determined rules based on previously cleansed descriptions and can be queried with a text query that includes the cleansed description as determined in blocks 610-612. At block 616, the rule module 114 categorizes the description based on the comparison at block 614. For example, if the cleansed description matches a rule in the database 116, then the transaction associated with the description received at block 602 can be assigned to the category of the matching rule. If the cleansed description does not match a rule in the database 116, then the rule module 114 can modify the rules in the database 116 and or create a new rule entry in the database 116, where the category is the newly cleansed description. This allows the system to improve its transaction categorization accuracy and also develop and learn new categories over time. In some embodiments, after new categories are generated or after a transaction is categorized, an indication or notification can be output to a user device 102.

Figure 7:
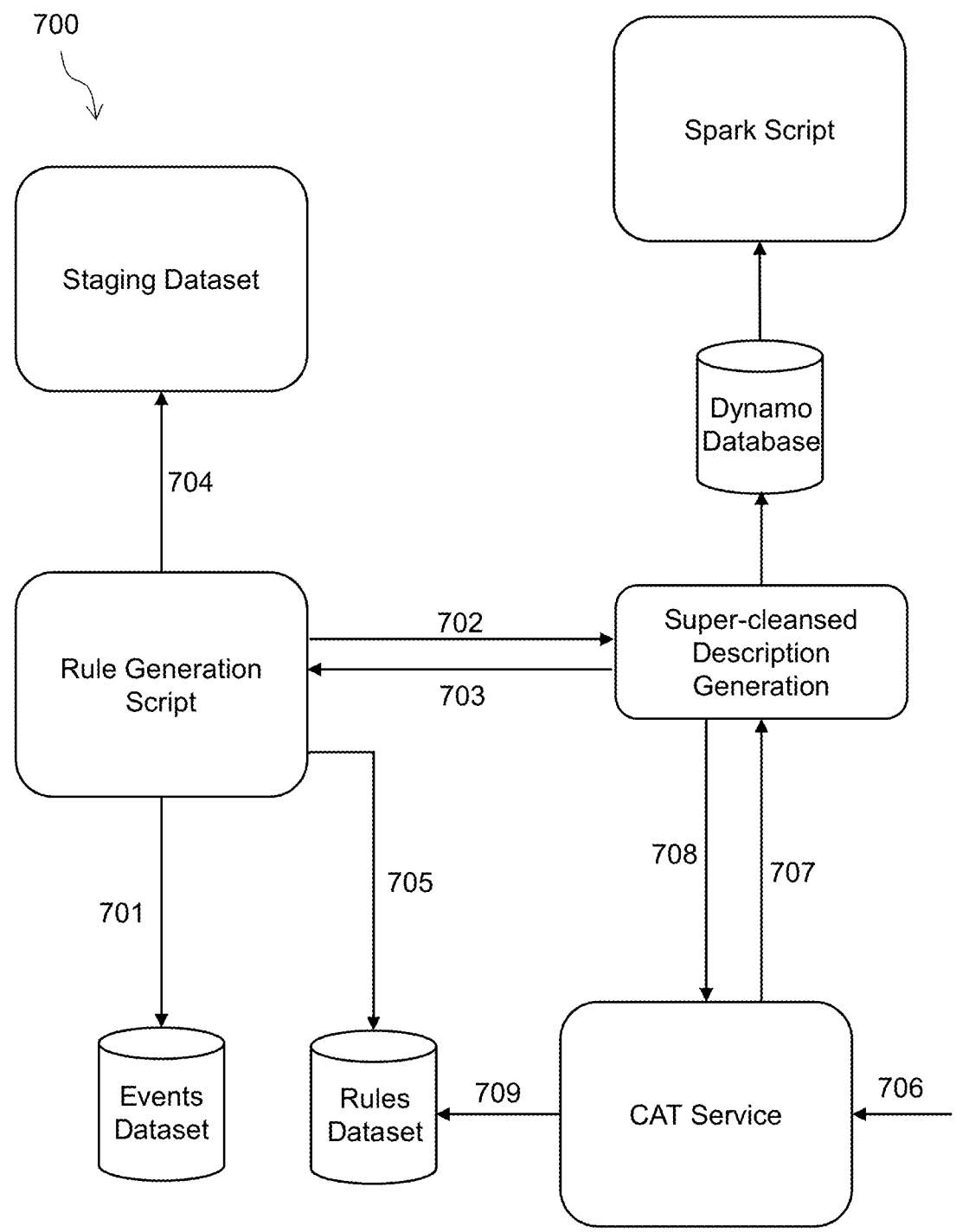
FIG. 7 shows an example system processing flow for categorizing transactions using natural language processing according to some embodiments of the present disclosure.

FIG. 7 shows an example system processing flow 700 for categorizing transactions using natural language processing according to some embodiments of the present disclosure. In some embodiments, the flow 700 represents a system 100 performing one or more of processes 300 and 600 using a rule generation script. At block 701, the rule generation script accesses an events database to obtain transactions that have historically been "recategorized" by users. A recategorized transaction can indicate that initial categorizations were incorrect and that users needed to manually categorize a transaction. At block 702, the rule generation script sends the descriptions from each recategorization event to a super-cleansed description generation module, which can include a library of commands to perform process 300 on each description. In some embodiments, the library of commands can include a Python library, can utilize a Dynamo database, and can utilize a Spark Script to continuously update the frequencies, bigram frequencies, and transition probabilities associated with each word and/or token that is used to calculate bigram scores, such as described in processes 300 and 600.

At block 703, the rule generation script receives the generated super-cleansed descriptions and transmits them (block 704) to update a staging dataset, which stores transaction descriptions that have been re-categorized by users and can be used to monitor the amount of times a description has been re-categorized. At block 705, the rule generation script uses the generated super-cleansed descriptions to generate rules in a rules dataset. At block 706, a new transaction comes in as part of a transaction stream, such as one from the financial services network 118 that provides transaction information for a plurality of users using financial products. The incoming transaction is processed by a categorization service and, at block 707, the description associated with the incoming transaction is sent to the super-cleansed description generation module. At block 708, categorization services receives the cleansed description associated with the incoming transaction and, at block 709, is sent to the rules dataset. The rules dataset is checked for rules matching the cleansed description, similar to as described at blocks 614 and 616.

Figure 8:
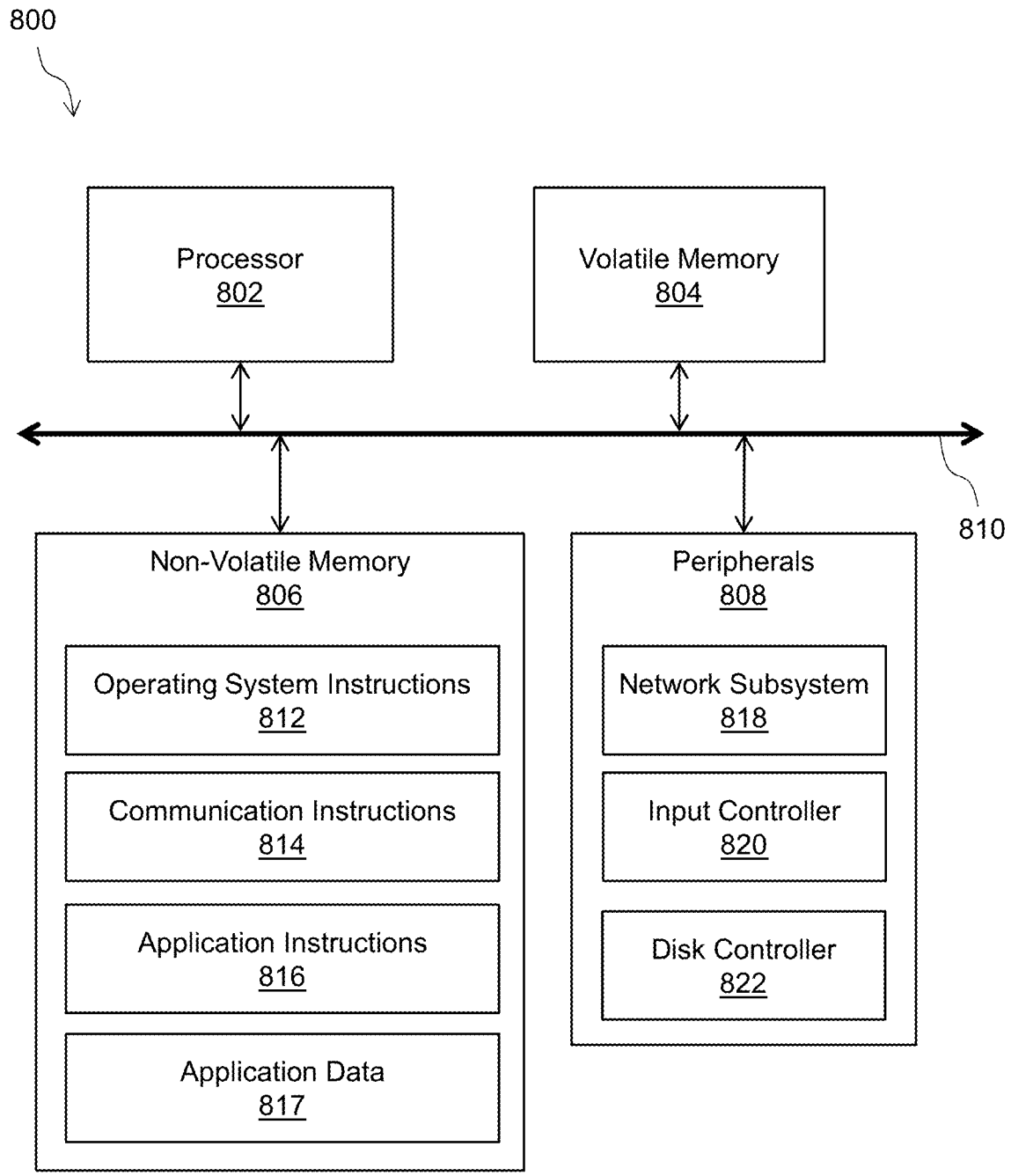
FIG. 8 is an example server device that can be used within the system of FIG. 1 according to an embodiment of the present disclosure.

FIG. 8 is a diagram of an example server device 800 that can be used within system 100 of FIG. 1. Server device 800 can implement various features and processes as described herein. Server device 800 can be implemented on any electronic device that runs software applications derived from complied instructions, including without limitation personal computers, servers, smart phones, media players, electronic tablets, game consoles, email devices, etc. In some implementations, server device 800 can include one or more processors 802, volatile memory 804, non-volatile memory 806, and one or more peripherals 808. These components can be interconnected by one or more computer buses 810.

Processor(s) 802 can use any known processor technology, including but not limited to graphics processors and multi-core processors. Suitable processors for the execution of a program of instructions can include, by way of example, both general and special purpose microprocessors, and the sole processor or one of multiple processors or cores, of any kind of computer. Bus 810 can be any known internal or external bus technology, including but not limited to ISA, EISA, PCI, PCI Express, USB, Serial ATA, or FireWire. Volatile memory 804 can include, for example, SDRAM. Processor 802 can receive instructions and data from a read-only memory or a random access memory or both. Essential elements of a computer can include a processor for executing instructions and one or more memories for storing instructions and data.

Non-volatile memory 806 can include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 806 can store various computer instructions including operating system instructions 812, communication instructions 814, application instructions 816, and application data 817. Operating system instructions 812 can include instructions for implementing an operating system (e.g., Mac OS®, Windows®, or Linux). The operating system can be multi-user, multiprocessing, multitasking, multithreading, real-time, and the like. Communication instructions 814 can include network communications instructions, for example, software for implementing communication protocols, such as TCP/IP, HTTP, Ethernet, telephony, etc. Application instructions 816 can include instructions for providing contextual information in conjunction with document understanding according to the systems and methods disclosed herein. For example, application instructions 816 can include instructions for components 108-114 described above in conjunction with FIG. 1. Application data 817 can include data corresponding to 108-114 described above in conjunction with FIG. 1.

Peripherals 808 can be included within server device 800 or operatively coupled to communicate with server device 800. Peripherals 808 can include, for example, network subsystem 818, input controller 820, and disk controller 822. Network subsystem 818 can include, for example, an Ethernet of WiFi adapter. Input controller 820 can be any known input device technology, including but not limited to a keyboard (including a virtual keyboard), mouse, track ball, and touch-sensitive pad or display. Disk controller 822 can include one or more mass storage devices for storing data files; such devices include magnetic disks, such as internal hard disks and removable disks; magneto-optical disks; and optical disks.

Figure 9:
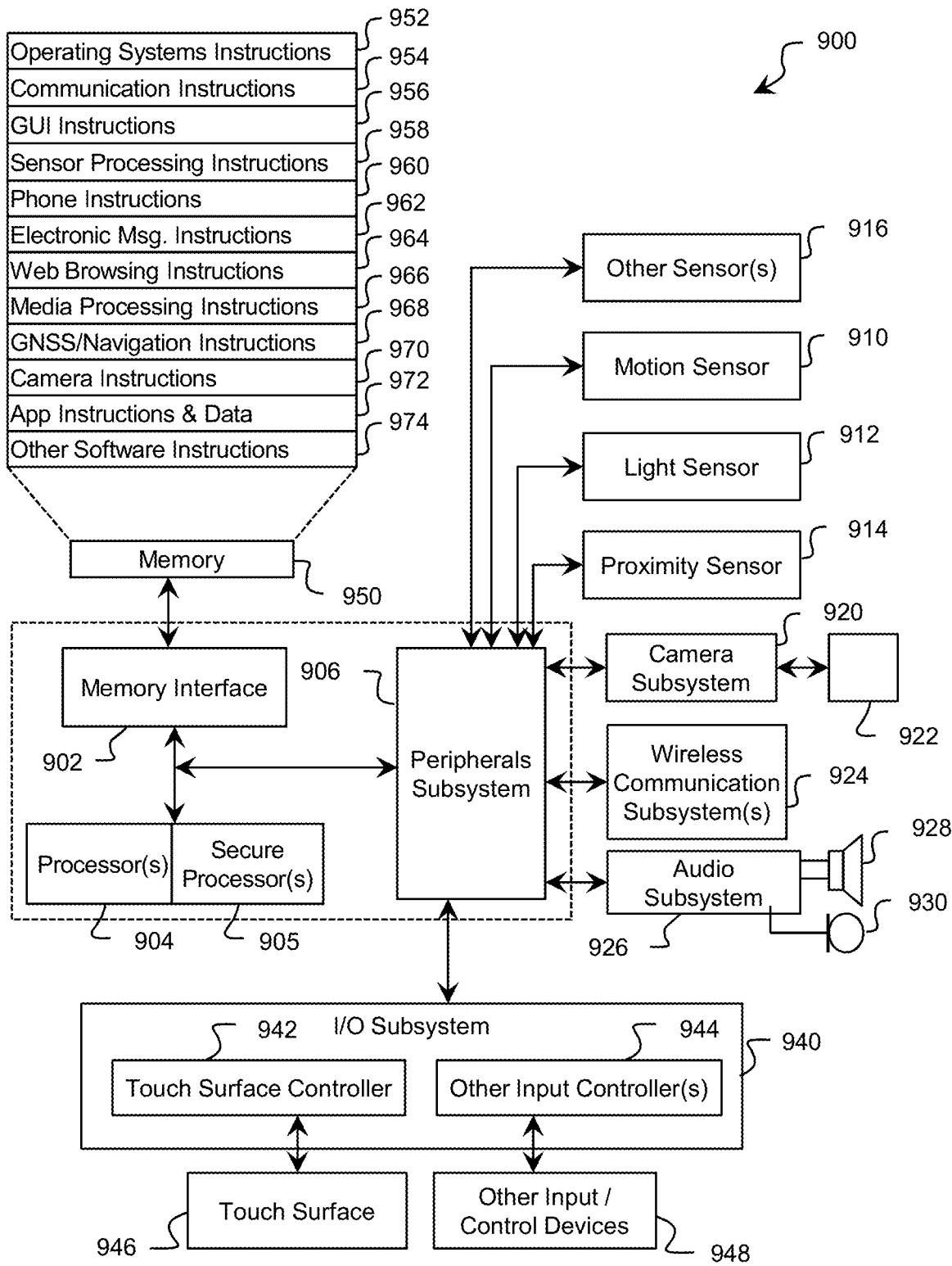
FIG. 9 is an example computing device that can be used within the system of FIG. 1 according to an embodiment of the present disclosure.

FIG. 9 is an example computing device that can be used within the system 100 of FIG. 1, according to an embodiment of the present disclosure. In some embodiments, device 900 can be any of user devices 102a-n. The illustrative user device 900 can include a memory interface 902, one or more data processors, image processors, central processing units 904, and/or secure processing units 905, and peripherals subsystem 906. Memory interface 902, one or more central processing units 904 and/or secure processing units 905, and/or peripherals subsystem 906 can be separate components or can be integrated in one or more integrated circuits. The various components in user device 900 can be coupled by one or more communication buses or signal lines.

Sensors, devices, and subsystems can be coupled to peripherals subsystem 906 to facilitate multiple functionalities. For example, motion sensor 910, light sensor 912, and proximity sensor 914 can be coupled to peripherals subsystem 906 to facilitate orientation, lighting, and proximity functions. Other sensors 916 can also be connected to peripherals subsystem 906, such as a global navigation satellite system (GNSS) (e.g., GPS receiver), a temperature sensor, a biometric sensor, magnetometer, or other sensing device, to facilitate related functionalities.

Camera subsystem 920 and optical sensor 922, e.g., a charged coupled device (CCD) or a complementary metal-oxide semiconductor (CMOS) optical sensor, can be utilized to facilitate camera functions, such as recording photographs and video clips. Camera subsystem 920 and optical sensor 922 can be used to collect images of a user to be used during authentication of a user, e.g., by performing facial recognition analysis.

Communication functions can be facilitated through one or more wired and/or wireless communication subsystems 924, which can include radio frequency receivers and transmitters and/or optical (e.g., infrared) receivers and transmitters. For example, the Bluetooth (e.g., Bluetooth low energy (BTLE)) and/or WiFi communications described herein can be handled by wireless communication subsystems 924. The specific design and implementation of communication subsystems 924 can depend on the communication network(s) over which the user device 900 is intended to operate. For example, user device 900 can include communication subsystems 924 designed to operate over a GSM network, a GPRS network, an EDGE network, a WiFi or WiMax network, and a Bluetooth™ network. For example, wireless communication subsystems 924 can include hosting protocols such that device 900 can be configured as a base station for other wireless devices and/or to provide a WiFi service.

Audio subsystem 926 can be coupled to speaker 928 and microphone 930 to facilitate voice-enabled functions, such as speaker recognition, voice replication, digital recording, and telephony functions. Audio subsystem 926 can be configured to facilitate processing voice commands, voiceprinting, and voice authentication, for example.

I/O subsystem 940 can include a touch-surface controller 942 and/or other input controller(s) 944. Touch-surface controller 942 can be coupled to a touch-surface 946. Touch-surface 946 and touch-surface controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch-surface 946.

The other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of speaker 928 and/or microphone 930.

In some implementations, a pressing of the button for a first duration can disengage a lock of touch-surface 946; and a pressing of the button for a second duration that is longer than the first duration can turn power to user device 900 on or off. Pressing the button for a third duration can activate a voice control, or voice command, module that enables the user to speak commands into microphone 930 to cause the device to execute the spoken command. The user can customize a functionality of one or more of the buttons. Touch-surface 946 can, for example, also be used to implement virtual or soft buttons and/or a keyboard.

In some implementations, user device 900 can present recorded audio and/or video files, such as MP3, AAC, and MPEG files. In some implementations, user device 900 can include the functionality of an MP3 player, such as an iPod™. User device 900 can, therefore, include a 36-pin connector and/or 8-pin connector that is compatible with the iPod. Other input/output and control devices can also be used.

Memory interface 902 can be coupled to memory 950. Memory 950 can include high-speed random access memory and/or non-volatile memory, such as one or more magnetic disk storage devices, one or more optical storage devices, and/or flash memory (e.g., NAND, NOR). Memory 950 can store an operating system 952, such as Darwin, RTXC, LINUX, UNIX, OS X, Windows, or an embedded operating system such as VxWorks.

Operating system 952 can include instructions for handling basic system services and for performing hardware dependent tasks. In some implementations, operating system 952 can be a kernel (e.g., UNIX kernel). In some implementations, operating system 952 can include instructions for performing voice authentication.

Memory 950 can also store communication instructions 954 to facilitate communicating with one or more additional devices, one or more computers and/or one or more servers. Memory 950 can include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic messaging-related process and functions; web browsing instructions 964 to facilitate web browsing-related processes and functions; media processing instructions 966 to facilitate media processing-related functions and processes; GNSS/Navigation instructions 968 to facilitate GNSS and navigation-related processes and instructions; and/or camera instructions 970 to facilitate camera-related processes and functions.

Memory 950 can store application (or "app") instructions and data 972, such as instructions for the apps described above in the context of FIGS. 1-7. Memory 950 can also store other software instructions 974 for various other software applications in place on device 900.

The described features can be implemented in one or more computer programs that can be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions can include, by way of example, both general and special purpose microprocessors, and the sole processor or one of multiple processors or cores, of any kind of computer. Generally, a processor can receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A computer implemented method for categorizing a transaction description, said method comprising:
    receiving a description associated with a transaction;
    extracting a plurality of candidate keywords from the description, wherein extracting the plurality of candidate keywords from the description comprises:
        tokenizing the description into a plurality of tokens;
        determining a frequency count of each token; and
        if a token is alphanumeric and an associated frequency count is above a count threshold, extracting the token as a candidate keyword;
    generating a plurality of n-grams from the plurality of candidate keywords, each n-gram comprising a set of one or more candidate keywords;
    calculating a score for each n-gram based on the one or more associated candidate keywords;
    determining the n-gram with a highest score; and
    generating a modified description with the determined n-gram.

2. The method of claim 1, wherein an n-gram score is based on frequency values and transition probabilities of the one or more associated candidate keywords.

3. The method of claim 2, wherein the frequency values and transition probabilities are pre-determined based on analyzing a database of historical transactions and transaction descriptions.

4. The method of claim 2, wherein calculating the n-gram score comprises:
    weighing a sum of the frequency values;
    weighing a sum of the transition probabilities; and
    adding the weighted sum of the frequency values and the weighted sum of the transition probabilities.

5. The method of claim 4, wherein calculating the n-gram score comprises adding a penalty to the n-gram score by reducing the n-gram score if the weighted sum of the frequency values is lower than a frequency penalty threshold.

6. The method of claim 4, wherein calculating the n-gram score comprises adding a penalty to the n-gram score by reducing the n-gram score if the weighted sum of the transition probabilities is lower than a transition probability threshold.

7. The method of claim 1 wherein if the token is alphanumeric and the associated count is not above the count threshold, said method comprises:
    splitting the token into one or more strings;
    obtaining one or more string frequency values associated with the one or more strings; and
    if a string frequency value is above the count threshold, extracting the string as a candidate keyword.

8. The method of claim 7, wherein extracting the plurality of candidate keywords from the description comprises:
    generating a plurality of bigrams based on the description;
    determining a frequency value for each generated bigram; and
    if the frequency value is above the count threshold, extracting the bigram as a candidate keyword.

9. A system for improving transaction categorization comprising:
    a computing device configured to:
        receive a description associated with a transaction from a financial services network;
        extract a plurality of candidate keywords from the description, wherein extracting the plurality of candidate keywords from the description comprises:
            tokenizing the description into a plurality of tokens;
            determining a frequency count of each token; and
            if a token is alphanumeric and an associated frequency count is above a count threshold, extracting the token as a candidate keyword;
        generate a plurality of n-grams from the plurality of candidate keywords, each n-gram comprising a set of one or more candidate keywords;
        calculate a score for each n-gram based on the one or more associated candidate keywords;
        determine the n-gram with a highest score;
        compare the n-gram with the highest score to a plurality of categories stored in a database; and
        categorize the description based on the comparing.

10. The system of claim 9, wherein an n-gram score is based on frequency values and transition probabilities of the one or more associated candidate keywords.

11. The system of claim 10, wherein the frequency values and transition probabilities are pre-determined based on analyzing a database of historical transactions and transaction descriptions.

12. The system of claim 10, wherein calculating the n-gram score comprises:
    weighing a sum of the frequency values;
    weighing a sum of the transition probabilities; and
    adding the weighted sum of the frequency values and the weighted sum of the transition probabilities.

13. The system of claim 12, wherein calculating the n-gram score comprises adding a penalty to the n-gram score by reducing the n-gram score if the weighted sum of the frequency values is lower than a frequency penalty threshold.

14. The system of claim 12, wherein calculating the n-gram score comprises adding a penalty to the n-gram score by reducing the n-gram score if the sum of the transition probabilities is lower than a transition probability threshold.

15. The system of claim 10, wherein if the token is alphanumeric and the associated count is not above the count threshold, said method comprises:
- splitting the token into one or more strings;
- obtaining one or more string frequency values associated with the one or more strings; and
- if a string frequency value is above the count threshold, extracting the string as a candidate keyword.

16. The system of claim 15, wherein extracting the plurality of candidate keywords from the description comprises:
- generating a plurality of bigrams based on the description;
- determining a frequency value for each generated bigram; and
- if the frequency value is above the count threshold, extracting the bigram as a candidate keyword.

17. A system for improving transaction categorization comprising:
- a computing device configured to:
  - receive a description in real-time associated with a transaction from a financial services network;
  - extract a plurality of candidate keywords from the description, wherein extracting the plurality of candidate keywords from the description comprises:
  - tokenizing the description into a plurality of tokens;
  - determining a frequency count of each token; and
  - if a token is alphanumeric and an associated frequency count is above a count threshold, extracting the token as a candidate keyword;
  - generate a plurality of n-grams from the plurality of candidate keywords, each n-gram comprising a set of one or more candidate keywords;
  - calculate a score for each n-gram based on the one or more associated candidate keywords;
  - determine the n-gram with a highest score;
  - compare the n-gram with the highest score to a plurality of categories stored in a database;
  - in response to matching the determined n-gram to a category of the plurality of categories, categorize the description with the matched category from the database; and
  - in response to not matching the determined n-gram to any categories of the plurality of categories, generate a new entry in the database with the determined n-gram.

18. The system of claim 17, the computing device being further configured to:
- access, via a Dynamo storage system, frequency values and transition probabilities of the one or more associated candidate keywords to calculate the n-gram score; and
- update the frequency values and transition probabilities based on the received description via the Dynamo storage system.

* * * * *